(12) United States Patent
Numata et al.

(10) Patent No.: US 11,408,487 B2
(45) Date of Patent: Aug. 9, 2022

(54) FORWARD/REVERSE SWITCHING MECHANISM

(71) Applicants: JATCO Ltd, Fuji (JP); NISSAN MOTOR CO., LTD., Yokohama (JP)

(72) Inventors: Kazuya Numata, Isehara (JP); Hiroyuki Matsushita, Tajimi (JP); Akira Kamiyama, Zama (JP); Ryousuke Katsuyama, Komae (JP); Tsukasa Shiino, Yokohama (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/274,010

(22) PCT Filed: Sep. 4, 2019

(86) PCT No.: PCT/JP2019/034711
§ 371 (c)(1),
(2) Date: Mar. 5, 2021

(87) PCT Pub. No.: WO2020/084913
PCT Pub. Date: Apr. 30, 2020

(65) Prior Publication Data
US 2021/0310543 A1 Oct. 7, 2021

(30) Foreign Application Priority Data

Oct. 22, 2018 (JP) .............................. JP2018-198801

(51) Int. Cl.
*F16H 3/54* (2006.01)
*F16D 25/0638* (2006.01)

(52) U.S. Cl.
CPC ........... *F16H 3/54* (2013.01); *F16D 25/0638* (2013.01); *F16H 2200/2005* (2013.01); *F16H 2200/2035* (2013.01)

(58) Field of Classification Search
CPC ... F16D 25/06–0638; F16H 2200/2005; F16H 2200/2035
See application file for complete search history.

(56) References Cited

U.S. PATENT DOCUMENTS 6,824,494 B2  11/2004  Yasuda et al.
6,832,974 B2  12/2004  Kakamu et al.
(Continued)

FOREIGN PATENT DOCUMENTS

JP  2005-273769 A  10/2005
JP  2011-075077 A  4/2011
(Continued)

OTHER PUBLICATIONS

U.S. Appl. No. 17/274,025, filed Mar. 5, 2021, Numata.
(Continued)

*Primary Examiner* — Ernesto A Suarez
*Assistant Examiner* — James J Taylor, II
(74) *Attorney, Agent, or Firm* — Foley & Lardner LLP

(57) ABSTRACT

A forward/reverse switching mechanism is provided with a planetary gear set, a reverse brake and a forward clutch. The planetary gear set includes a sun gear which serves as an input part, a carrier which serves as an output part, and a ring gear. The reverse brake is adapted to fix the ring gear. The forward clutch is adapted to connect the ring gear and the sun gear to each other. The ring gear, a drive plate provided on a ring gear side of the reverse brake and a driven plate provided on a ring gear side of the forward clutch are spline-fitted to a clutch drum.

6 Claims, 3 Drawing Sheets

(56) References Cited

U.S. PATENT DOCUMENTS

| | | | | |
|---|---|---|---|---|
| 7,350,631 | B2* | 4/2008 | Furuichi | F16D 13/683 |
| | | | | 192/30 W |
| 9,458,909 | B2* | 10/2016 | Sugimoto | F16H 3/48 |
| 10,247,292 | B2* | 4/2019 | Kao | F16H 3/66 |
| 2005/0215374 | A1 | 9/2005 | Kaneda | |
| 2019/0344660 | A1* | 11/2019 | Kumar | B60K 7/0007 |
| 2019/0376588 | A1* | 12/2019 | Dahlback | F16H 37/046 |

FOREIGN PATENT DOCUMENTS

| | | |
|---|---|---|
| JP | 2014-070732 A | 4/2014 |
| WO | WO-2011/151916 A1 | 12/2011 |

OTHER PUBLICATIONS

U.S. Office Action on U.S. Appl. No. 17/274,025 dated Jan. 5, 2022.
Notice of Allowance issued for U.S. Appl. No. 17/274,025 dated Apr. 4, 2022 (8 pages).

* cited by examiner

FORWARD/REVERSE SWITCHING MECHANISM

The present application is a 371 Application of PCT/JP2019/034711, filed Sep. 4, 2019, which claims priority to Japanese Patent Application No. 2018-198801 filed with the Japan Patent Office on Oct. 22, 2018, all the contents of each of which are hereby incorporated by reference.

TECHNICAL FIELD

The present invention relates to a forward/reverse switching mechanism.

BACKGROUND ART

Patent Document 1 discloses a forward/reverse switching mechanism of the type having a sun gear as an input and a carrier as an output. In this switching mechanism, a ring gear is set as a floating member and is fixed by a support member; and a forward clutch is arranged to provide connection between the sun gear and the carrier, that is, between the input part and the output part.

Patent Document 2 discloses a forward/reverse switching mechanism of the type having a ring gear as an input and a sun gear as an output. In this switching mechanism, a carrier is set as a floating member and is fixed by a support member; and a forward clutch is arranged to provide connection between the ring gear and the sun gear, that is, between the input part and the output part.

In each of Patent Documents 1 and 2, the supporting member is used to fix the floating member as mentioned above. The use of such a support member leads to an increase in parts count.

It is preferable that the forward/reverse switching mechanism is less in parts count. There has thus been a demand to reduce the parts count of the forward/reverse switching mechanism.

PRIOR ART DOCUMENTS

Patent Documents

Patent Document 1: International Publication No. 2011/151916
Patent Document 2: Japanese Laid-Open Patent Publication No. 2005-273769

SUMMARY OF THE INVENTION

The present invention is directed to a forward/reverse switching mechanism, comprising:
 a planetary gear set having a sun gear which constitutes one of an input part and an output part, a carrier which constitutes the other of the input part and the output part, and a ring gear;
 a brake adapted to fix the ring gear;
 a clutch adapted to connect the ring gear and the sun gear to each other; and
 a drum member coupled by spline fitting with the ring gear, a brake plate provided on a side of the brake close to the ring gear and a clutch plate provided on a side of the clutch close to the ring gear.

According to the present invention, the ring gear is set as a floating member and shaped to allow spline fitting. The ring gear and the brake plate are spline-fitted to the drum member to which the clutch plate is spline-fitted. There is hence no need to newly provide a support member for supporting the ring gear set as the floating member. There is also no need to newly provide a support member for supporting the brake plate. The forward/reverse switching mechanism is therefore reduced in parts count.

DETAILED DESCRIPTION OF EMBODIMENTS

Hereinafter, an embodiment of the present invention will be described below by taking, as an example, a planetary gear train provided in a forward/reverse switching mechanism 2 of a belt-type continuously variable transmission 1 of a vehicle.

Figure 1:
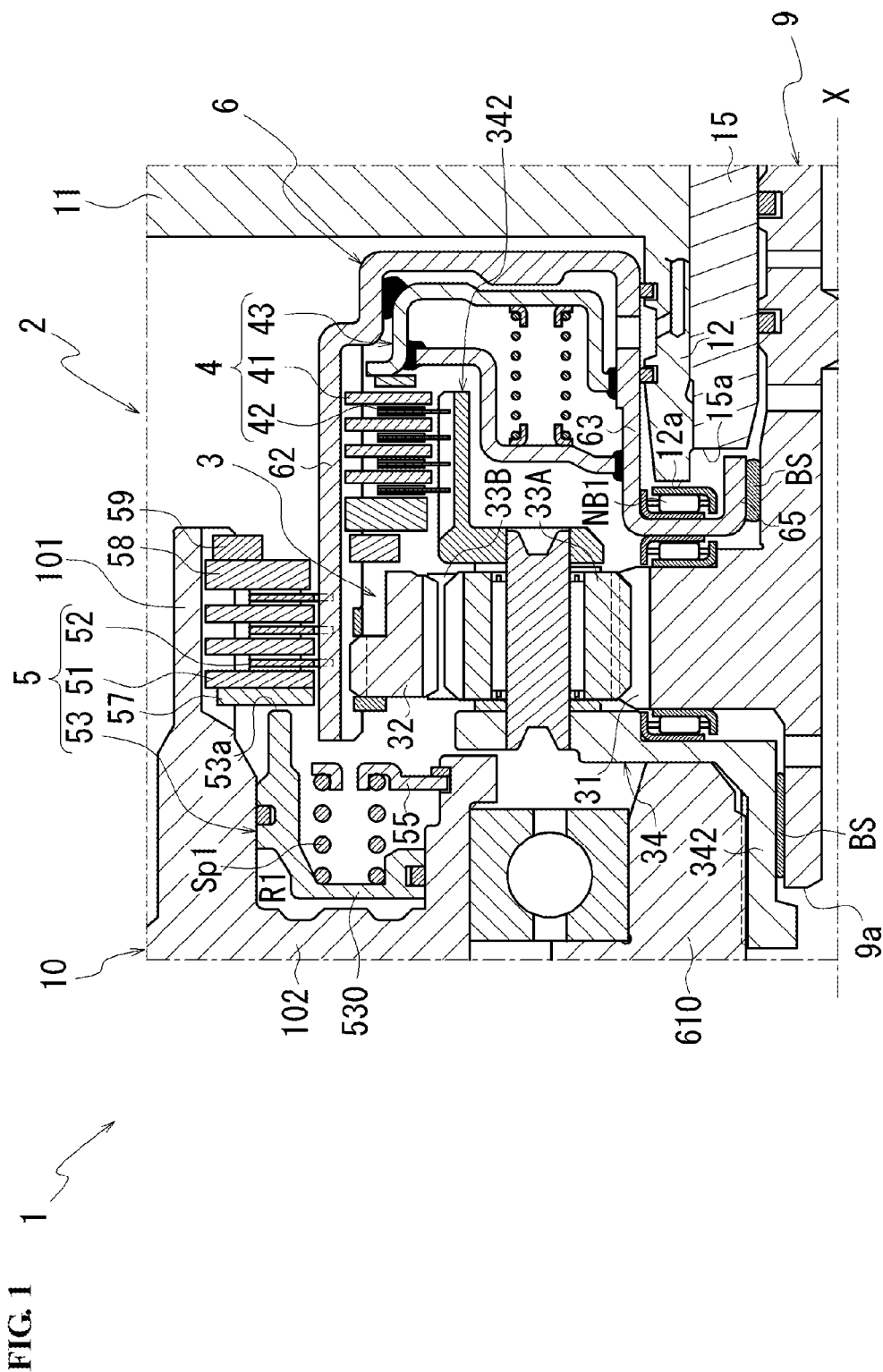
FIG. 1 is a schematic view of a forward/reverse switching mechanism and its surroundings according to one embodiment of the present invention.

FIG. 1 is a schematic view of the vicinity of the forward/reverse switching mechanism 2 of the belt-type continuously variable transmission 1.

Figure 2:
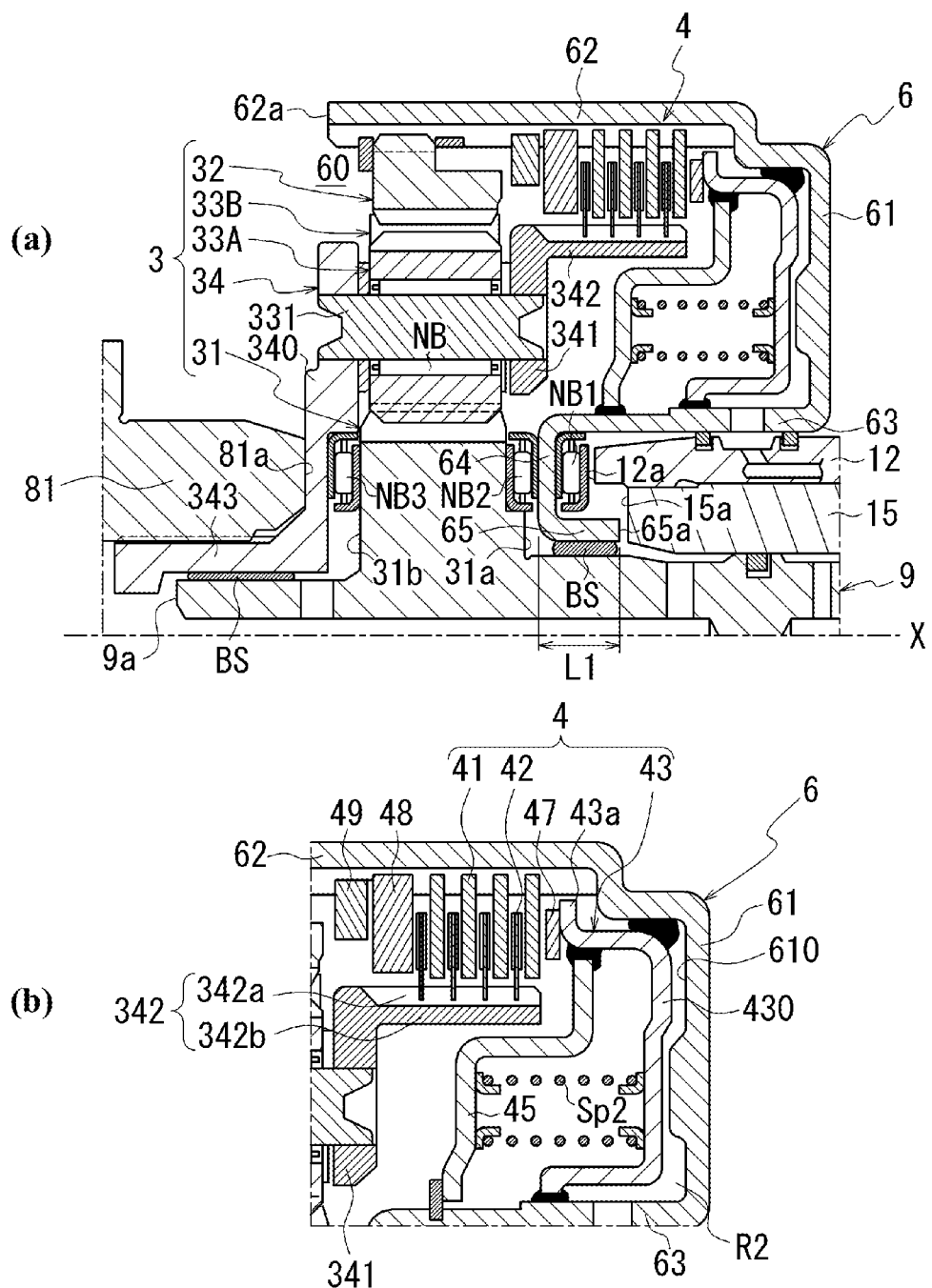
FIG. 2 is a schematic view of a main part of the forward/reverse switching mechanism.

FIG. 2 is a schematic view of a main part of the forward/reverse switching mechanism 2. More specifically, FIG. 2(*a*) is a schematic view showing the vicinity of a planetary gear set 3 in the forward/reverse switching mechanism; and FIG. 2(*b*) is a schematic view showing the vicinity of a forward clutch 4 in the forward/reverse switching mechanism. In FIG. 2(*a*), the vicinity of a reverse brake 5 is omitted for illustration for convenience of explanation.

Figure 3:
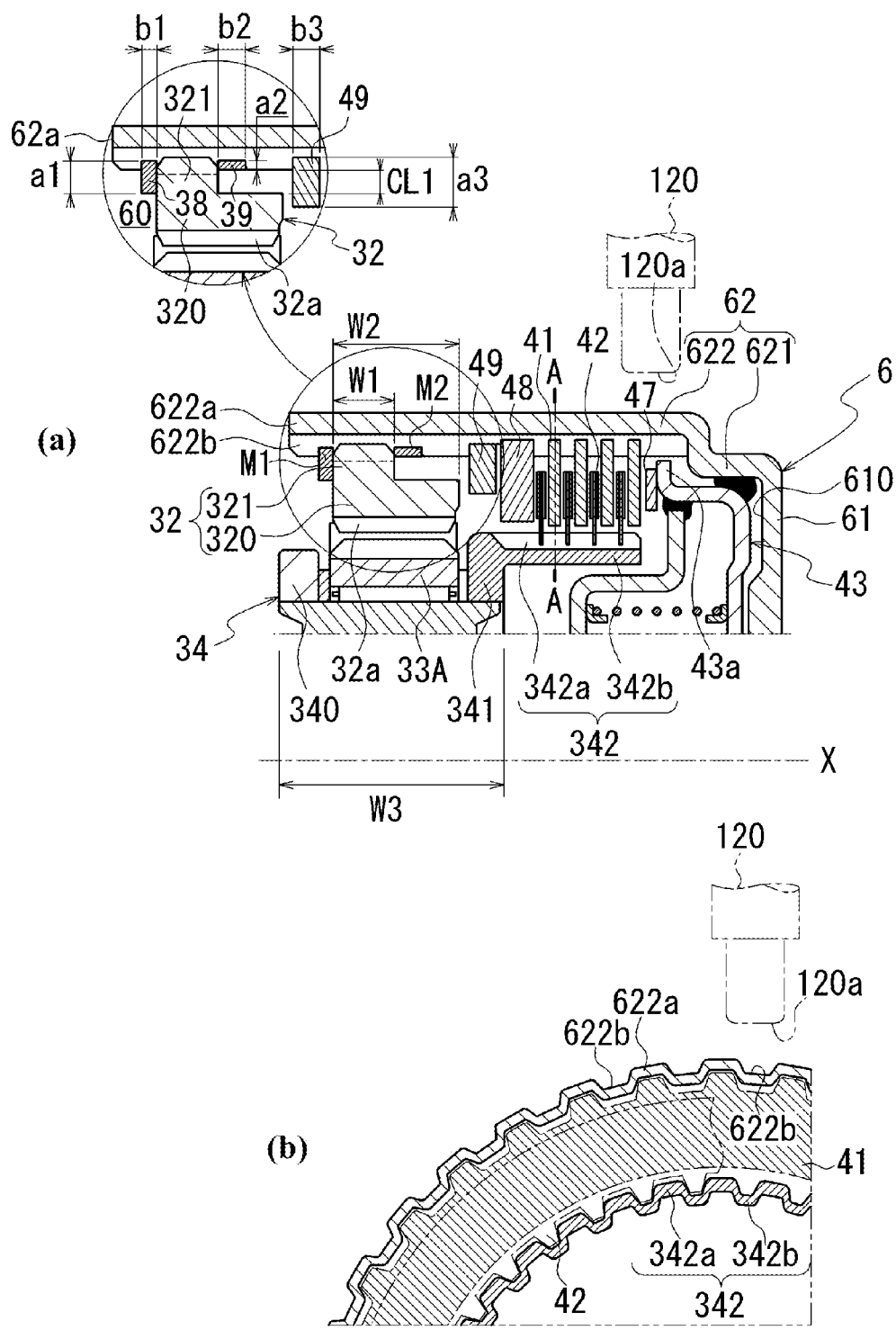
FIG. 3 is a schematic enlarged view of the main part of the forward/reverse switching mechanism.

FIG. 3 is a schematic enlarged view of the main part of the forward/reverse switching mechanism 2. More specifically, FIG. 3(*a*) is an enlarged view showing the arrangement of a ring gear 32 of the planetary gear set 3 in a clutch drum 6 of the forward/reverse switching mechanism; and FIG. 3(*b*) is a cross-sectional view taken along line A-A of FIG. 3(*a*).

In the belt-type continuously variable transmission 1, a rotational driving force of an engine (not shown) is inputted to the forward/reverse switching mechanism 2 through an output shaft (as a rotation transmission shaft 9) of a torque converter (not shown) as shown in FIG. 1.

The forward/reverse switching mechanism 2 is provided with the planetary gear set 3, the forward clutch 4 and the reverse brake 5.

In the forward/reverse switching mechanism 2, rotation inputted from the torque converter is outputted as normal rotation to a transmission mechanism (not shown) when the forward clutch 4 is engaged; and, when the reverse brake 5 is engaged, rotation inputted from the torque converter is outputted as reverse rotation to the transmission mechanism.

[Reverse Brake]

The reverse brake 5 includes: driven plates 51 spline-fitted to the inner circumference of a support wall 101 of a transmission case 10; drive plates 52 spline-fitted to the outer circumference of a circumferential wall 62 of the clutch drum 6; and a piston 53 operable to make a stroke in a direction of the rotation axis X.

The driven plates 51 are disposed inside the support wall 101, which is a fixed-side member, so as to be movable in the direction of the rotation axis X in a state that rotation of the driven plates 51 about the rotation axis X is restricted.

The drive plates 52 are disposed outside the circumferential wall 62 so as to be movable in the direction of the rotation axis X in a state that rotation of the drive plates 52 relative to the clutch drum 6 in a circumferential direction around the rotation axis X is restricted.

The driven plates 51 and the drive plates 52 are alternately arranged in the direction of the rotation axis X such that inner diameter sides of the driven plates 51 and outer diameter sides of the drive plates 52 overlap with one another.

When viewed from the driven and drive plates 51 and 52, a retaining plate 58 is disposed on a side opposite to the piston 53 (i.e. a right side in the figure). This retaining plate is fixed in position by a snap ring 59.

A pressing portion 53a of the piston 53 is opposed to the overlap region of the driven and drive plates 51 and 52, with a wave spring 57 interposed therebetween.

The transmission case 10 has a partition wall 102 as a partition between a space for installing the forward/reverse switching mechanism 2 and a space for installing the transmission mechanism. A hydraulic chamber R1 into which a hydraulic pressure for the piston 53 is supplied is formed in a portion of the partition wall 102 facing a ring-shaped base portion 530 of the piston 53.

When the hydraulic pressure is supplied to the hydraulic chamber R1, the piston 53 moves in a direction away from the partition wall 102 (i.e. a right direction in the figure) while compressing a spring Sp1 which is supported by a spring retainer 55.

Then, the driven plates 51 and the drive plates 52 move toward the retaining plate 58 by being pressed by the pressing portion 53a of the piston 53.

Consequently, the driven plates 51 and the drive plates 52 are held between the pressing portion 53a and the retaining plate 58 under a pressure corresponding to the hydraulic pressure.

When the driven plates 51 and the drive plates 52 are engaged unrotatably relative to each other, the reverse brake 5 comes into an engaged state. In this state, the clutch drum 6 is restricted from rotation. The ring gear 32, which is spline-fitted to the inner circumference of the circumferential wall 62 of the clutch drum 6 as mentioned later in detail, is also indirectly restricted from rotation.

[Forward Clutch]

The forward clutch 4 includes: driven plates 41 spline-fitted to the inner circumference of the circumferential wall 62 of the clutch drum 6; drive plates 42 spline-fitted to the outer circumference of a cylindrical support tube 342; and a piston 43 hydraulically operable to make a stroke in the direction of the rotation axis X.

The support tube 342 has the function of a so-called clutch hub.

As shown in FIG. 2(b), the driven plates 41 are disposed inside the circumferential wall 62 so as to be movable in the direction of the rotation axis X in a state that rotation of the driven plate 41 about the rotation axis X is restricted.

The drive plates 42 are disposed outside the support tube 342 so as to be movable in the direction of the rotation axis X in a state that rotation of the drive plates 42 relative to the support tube 342 in the circumferential direction around the rotation axis X is restricted.

The support tube 342 has spline peak sections 342a and spline valley sections 342b formed on an outer diameter side thereof alternately in the circumferential direction around the rotation axis X. In the present embodiment, the support tube 342 is made integral with a side plate portion 341 of the after-mentioned carrier 34 (see FIG. 3(a)).

The drive plates 42 are spline-fitted to the outer circumference of the spline peak sections 342a of the support tube 342.

As shown in FIG. 2, the driven plates 41 and the drive plates 42 are alternately arranged in the direction of the rotation axis X such that inner diameter sides of the driven plates 41 and outer diameter sides of the drive plates 42 overlap with one another.

When viewed from the driven and drive plates 41 and 42, a retaining plate 48 is disposed on a side opposite to the piston 43 (i.e. a left side in the figure). This retaining plate is fixed in position by a snap ring 49.

A pressing portion 43a of the piston 43 is opposed to the overlap region of the driven and drive plates 41 and 42, with a wave spring 47 interposed therebetween.

The piston 43 is disposed in a ring-shaped recess portion 610 of a bottom wall 61 of the clutch drum 6 so as to be movable back and forth in the direction of the rotation axis X. A hydraulic chamber R2 into which a hydraulic pressure for the piston 43 is supplied is formed in a portion of the bottom wall 61 facing a ring-shaped base portion 430 of the piston 43.

When the hydraulic pressure is supplied to the hydraulic chamber R2, the piston 43 moves in a direction away from the bottom wall 61 (i.e. a left direction in the figure) while compressing a spring Sp2 which is supported by a spring retainer 45.

Then, the driven plates 41 and the drive plates 42 move toward the retaining plate 48 by being pressed by the pressing portion 43a of the piston 43.

Consequently, the driven plates 41 and the drive plates 42 are held between the pressing portion 43a and the retaining plate 48 under a pressure corresponding to the hydraulic pressure.

When the driven plates 41 and the drive plates 42 are engaged unrotatably relative to each other, the forward clutch 4 comes into an engaged state.

Herein, the support tube 342 to which the drive plates 42 are spline-fitted is made integral with the side plate portion 341 of the carrier 34 of the planetary gear set 3 as mentioned above. Relative rotation of the clutch drum 6 and the carrier 34 of the planetary gear set 3 is thus restricted in the engaged state of the forward clutch 4.

[Planetary Gear Set]

As shown in FIG. 2(a), the planetary gear set 3 includes: a sun gear 31 rotatable together with the rotation transmission shaft 9; the ring gear 32 rotatable together with the clutch drum 6; and a pair of pinion gears 33A and 33B disposed between the sun gear 31 and the ring gear 32.

The pinion gears 33A and 33B have respective gear teeth formed on outer circumferential surfaces thereof and brought into engagement with each other. The pinion gear 33A is in engagement with the outer circumference of the sun gear 31, whereas the pinion gear 33B is in engagement with the inner circumference of the ring gear 32. In the present embodiment, the planetary gear set 3 is a double pinion type planetary gear system. The planetary gear set 3 may alternatively be a single pinion type planetary gear system.

The pinion gear 33A is supported on a pinion shaft 331 via a needle bearing NB. Both ends of the pinion shaft 331 are respectively supported by the side plate portions 340 and 341 of the carrier 34.

When the sun gear 31 and/or the ring gear 32 of the planetary gear set 3 rotates about the rotation axis X, the pinion gear 33A supported on the pinion shaft 331 and the pinion gear 33B engaged with the pinion gear 33A revolve around the rotation axis X while rotating.

As shown in FIG. 1, the planetary gear set 3 is installed along with the forward clutch 4 in the clutch drum 6 inside the transmission case 10.

As shown in FIG. 2(a), the clutch drum 6 includes: the bottom wall 61 having a ring shape when viewed in the direction of the rotation axis X; the outer circumferential wall 62 surrounding and extending from the entire outer circumference of the bottom wall 61; and an inner circumferential wall 63 surrounding and extending from the entire inner circumference of the bottom wall 61.

A distal end of the outer circumferential wall 62 opposite to the bottom wall 61 (i.e. on a left side in the figure) is formed to define an opening 60.

The inner circumferential wall 63 has a circular cylindrical shape along the rotation axis X. This circumferential wall 63 is fitted around a cylindrical support wall 12, which is provided on an inner diameter side of a cover member 11, from the transmission mechanism side (i.e. a left side in FIG. 2). The clutch drum 6 is accordingly supported on the cylindrical support wall 12, which is a fixing member of the transmission case 10, in a state that rotation of the clutch drum 6 about the rotation axis 6 is allowed.

A communication part 64 is provided on a distal end of the inner circumferential wall 63 such that the communication part extends toward an inner diameter side (i.e. toward the rotation axis X) while bypassing the support wall 12. A cylindrical support tube 65 is provided on an inner diameter side of the communication part 64.

The support tube 65 extends linearly from an inner circumferential edge of the communication part 64 in a direction away from the sun gear 31 (i.e. a right direction in the figure). A distal end 65a of the support tube 65 is arranged to reach an inner diameter side of the support wall 12 and is opposed to a distal end 15a of a cylindrical shaft 15, which is press-fitted into the inner circumference of the support wall 12, with a clearance left therebetween.

A needle bearing NB1 is disposed between the outer circumference of the support tube 65 and the inner circumference of the circumferential wall 63. The needle bearing NB1 is located at a position between the communication part 64 and a distal end 12a of the support wall 12 in the direction of the rotation axis X so as to prevent direct contact of the communication part 64 and the support wall 12.

The support tube 65 is formed with a predetermined length L1 in the direction of the rotation axis X. The inner circumference of the support tube 65 is supported on the outer circumference of the rotation transmission shaft 9 via a bushing BS (as a metal ring of less friction resistance). The bushing BS is press-fitted into the inner circumference of the support tube 65 of the clutch drum 6. Accordingly, the clutch drum 6 with the support tube 65 is supported on the support wall 12 so as to be rotatable about the rotation axis X in a state that inclination of the clutch drum 6 relative to the rotation axis X is restricted by the support tube 65. Further, the clutch drum 6 is positioned in the radial direction by the bushing BS which is supported on the rotation transmission shaft 9.

As mentioned above, the rotation transmission shaft 9 is the output shaft of the torque converter. The rotation transmission shaft 9 is rotatably supported on the cylindrical shaft 15 which is press-fitted into the inner circumference of the support wall 12.

A distal end 9a side of the rotation transmission shaft 9 passes through an inner diameter side of the support tube 65 in the direction of the rotation axis X. The sun gear 31 is integrally formed, on an outer circumferential portion of the rotation transmission shaft 9 adjacent to the distal end 9a, so as to avoid interference with the support tube 65.

The sun gear 31 protrudes outwardly in the radial direction of the rotation axis X from the outer circumference of the rotation transmission shaft 9 at a position separated toward the torque converter side (i.e. a right side in the figure) from the distal end 9a.

A needle bearing NB2 is disposed between one side surface 31a of the sun gear 31 in the direction of the rotation axis X and the communication part 64 of the clutch drum 6.

The distal end 9a side of the rotation transmission shaft 9 is inserted in a cylindrical communication part 343 which is provided on an inner diameter side of the carrier 34.

A bushing BS is disposed between the outer circumference of the rotation transmission shaft 9 and the inner circumference of the communication part 343. The communication part 343 of the carrier 34 is supported on the rotation transmission shaft 9 via the bushing BS. The communication part 343 of the carrier 34 and the rotation transmission shaft 9 are rotatable relative to each other about the rotation axis X.

The side plate portion 340 of the carrier 34 extends outwardly in the radial direction from a torque converter-side end of the communication part 343. A distal end 81a of an input shaft 81 of the transmission mechanism abuts the side plate portion 340 from the direction of the rotation axis X. In this state, the inner circumference of the input shaft 81 and the outer circumference of the communication part 343 are spline-fitted so that the communication part 343 of the carrier 34 and the input shaft 81 of the transmission mechanism are coupled unrotatably relative to each other.

In the planetary gear set 3, the sun gear 31 serves as an input part to which rotation is inputted from the torque converter; and the carrier 34 serves as an output part from which rotation is outputted to the transmission mechanism. The input and output parts are reversed during towed running of the vehicle with the continuously variable transmission 1.

In the present specification, any part of the planetary gear set 3 other than the input and output parts is referred to as a "floating member". In the present embodiment, the ring gear 32 corresponds to a "floating member".

The ring gear 32 of the planetary gear set 3 is spline-fitted to the inner circumference of the outer circumferential wall 62 of the clutch drum 6.

As shown in FIG. 3(a), the outer circumferential wall 62 of the clutch drum 6 includes a small-diameter portion 621 located adjacent to the bottom wall 61 and a large-diameter portion 622 made larger in diameter than the small-diameter portion 621.

The circumferential wall 62 has spline peak sections 622a and spline valley sections 622b formed on the large-diameter portion 622 alternately in the circumferential direction around the rotation axis X.

These spline peak and valley sections 622a and 622b are provided over the region from a distal end 62a of the circumferential wall 62 to a junction of the large-diameter portion and the small-diameter portion 621. In other words, the spline peak and valley sections 622a and 622b are provided (extend) throughout the entire length of the large-diameter portion 621 in the direction of the rotation axis X.

As shown in FIG. 3(b), the spline peak and valley sections 622a and 622b are substantially uniform in thickness. On the inner circumferential surface of the circumferential wall 62, the back side of the spline peak section 622a reversely becomes a valley section (groove); and the back side of the spline valley section 622b reversely becomes a peak section. The drive plates 52 of the reverse brake 5 are spline-fitted to the spline peak and valley sections 622a and 622b of the outer circumferential surface of the circumferential wall 62. The driven plates 41 of the forward clutch 4 are spline-fitted to the spline peak and valley sections of the inner circumferential surfaces of the circumferential wall 62. As in the case of the driven plates 41, the ring gear 32 is spline-fitted to the spline valley and peak sections of the inner circumferential surface of the circumferential wall 62.

On the circumferential wall 62 of the clutch drum 6, the spline peak and valley sections 622a and 622b are provided over the entire length of the large-diameter portion 622 in the longitudinal direction (i.e. the direction of the rotation axis X).

Herein, any component of the reverse brake 5 is not disposed on the outer circumference of a part of the large-diameter portion 622 adjacent to the small-diameter portion 621; and the spline peak and valley sections 622a and 622b are provided on the large-diameter portion 622 alternately in the circumferential direction around the rotation axis X. The outer circumference of the part of the large-diameter portion 622 adjacent to the small-diameter portion 621 can be thus used as a sensor area (that is, a detected part) of a rotation speed sensor 120.

When the rotation speed sensor 120 is arranged at a location indicated by an imaginary line in FIG. 3(a), the spline peak and valley sections 622a and 622b are located on an extension of the sensor area 120a of the rotation speed sensor 120 as shown in FIG. 3(b). In this location, the rotation speed sensor 120 is configured to output pulse signals that consist of On and Off signals corresponding to the spline peak and valley sections 622a and 622b to a control device (not shown).

The region where the rotation speed sensor 120 is arranged in FIG. 3(a) is in the vicinity of the support wall 101 (see FIG. 1) which serves as a partition between the region where the forward/reverse switching mechanism 2 is arranged in the transmission case 10 and the region where an oil pump is arranged. On that account, there is formed an opening into which the rotation speed sensor 120 is fitted. It is thus possible to install the rotation speed sensor 120 without the need to change the shape of the transmission case 10 and the layout inside the transmission case 10.

The large-diameter portion 622 of the circumferential wall 62 is provided over a radially outer side of the forward clutch 4 and a radially outer side of the ring gear 32 of the planetary gear set 3 in the direction of the rotation axis X.

The drive plates 52 of the reverse brake 5 (see FIG. 1) are spline-fitted to the outer circumference of a part of the circumferential wall 62 adjacent to the distal end 62a. The ring gear 32 is located on an inner diameter side of a part of the reverse brake 5 in which the driven and drive plates 51 and 52 are alternately arranged.

As shown in FIG. 3(a), the ring gear 32 includes a ring-shaped base portion 320 having a tooth profile 32a formed on an inner circumference thereof and a spline fitting portion 321 protruding radially outwardly from an outer circumference of the base portion 320.

The spline fitting portion 321 protrudes radially outwardly from the outer circumference of one end side (opening 60 side) of the base portion 320 in the direction of the rotation axis X. This spring fitting portion 321 is provided for spline-fitting of the ring gear 32 to the inner circumference of the large-diameter portion 622 of the clutch drum 6.

A width W1 of the spring fitting portion 321 in the direction of the rotation axis X is smaller than a width W2 of the base portion 320 in the direction of the rotation axis X. These width values W1 and W2 are smaller than a width W3 of the side plate portion 340, 341 of the carrier 34.

When the ring gear 32 is spline-fitted to the inner circumference of the large-diameter portion 622, there is a radial clearance CU formed on the forward clutch 4 side (i.e. a right side in the figure) of the spring fitting portion 321.

A first snap ring 38 and a second snap ring 39 are inserted and fixed in the inner circumference of the large-diameter portion 622 at both sides of the spline fitting portion 321 of the ring gear 32. These first and second snap rings 38 and 39 are provided for positioning of the ring gear 32 in the direction of the rotation axis X. The first and second snap rings 38 and 39 are fitted in recesses M1 and M2 of the circumferential wall 62, respectively. Thicknesses b1 and b2 of the first and second snap rings 38 and 39 in the direction of the rotation axis X are consistent with widths of the recesses M1 and M2 in the direction of the rotation axis X.

In the present embodiment, the first snap ring 38 is arranged at a position displaced in the direction of the rotation axis X from the region radially outside the ring gear 32. Thus, the first snap ring 38 does not overlap with the ring gear 32 in the radial direction. This first snap ring 38 is provided for preventing fall-off of the ring gear 32 from the opening of the bottomed cylindrical-shaped clutch drum 6.

The second snap ring 39 is arranged at a position within the region radially outside the ring gear 32. Thus, the second snap ring 39 overlaps with the ring gear 32 in the radial direction. This second snap ring 39 is provided for preventing movement of the ring gear 32 toward the bottom wall 61 of the clutch drum 6.

The ring gear 32 is positioned by the second snap ring 39 so as to avoid interference with the above-mentioned snap ring 49 (as a third snap ring) of the forward clutch 4. Accordingly, there is a clearance left between the ring gear 32 and the snap ring 49 in the direction of the rotation axis.

If the ring gear 32 is always in contact with the snap ring 49, the amount of misalignment of the ring gear 32 relative to the sun gear 31 and the pinion gears 33A and 33B becomes large with the application of a pressing force of the piston 43 (as a clutch piston) to the ring gear 32. In such a case, there is a possibility of gear noise. When the clearance is left between the ring gear and the snap ring, however, the occurrence of gear noise is suitably prevented.

A length a1 of the first snap ring 38 in the radial direction is longer than a length a2 of the second snap ring 39 in the radial direction.

It is because the length of the second snap ring 39 needs to be adjusted in such a manner that the second snap ring 39 can be arranged in the clearance CL1 between the outer circumference of the base portion 320 of the ring gear 32 and the inner circumference of the circumferential wall 62 (spline valley sections 622b) so as to overlap with the ring gear 32 in the radial direction.

As there is no need to arrange the second snap ring 39 at a position displaced in the direction of the rotation axis X from the region radially outside the ring gear 32, it is possible to prevent upsizing of the circumferential wall 62 of the clutch drum 6 in the direction of the rotation axis X.

In the present embodiment, the thickness b1 of the first snap ring 38 in the direction of the rotation axis X is made different from the thickness b2 of the second snap ring 39 in the direction of the rotation axis X for the purpose of distinguishing the first snap ring 38 and the second snap ring 39 from each other.

Further, the thickness b1 of the first snap ring 38 in the direction of the rotation axis X is made smaller than the thickness b2 of the second snap ring 39 in the direction of the rotation axis X. When the thickness b1 of the first snap ring 38 in the direction of the rotation axis X is large, a space which does not contribute to installation of the component parts of the planetary gear set 3 etc. is left on the opening 60 side of the circumferential wall 60. Such a space is not favorable because it leads to an increase in the size of the circumferential wall 62 of the clutch drum 6 in the direction of the rotation axis X.

In the clutch drum 6, the second snap ring 39 is located closer to the bottom wall 61 (i.e. located more inward) than the first snap ring 38. In other words, the second snap ring 38 is located closer to the opening 60 of the bottomed cylindrical-shaped clutch drum 6 than the second snap ring 39.

By arranging the snap ring having a smaller thickness in the direction of the rotation axis X (that is, the first snap ring 38) on the opening 60 side, the opening 60 side space inside the circumferential wall 62 of the clutch drum 6 is effectively used.

When viewed from the second snap ring 39, the snap ring 49 of the forward clutch 4 (as the third snap ring) is disposed on a side closer to the bottom wall 61 of the clutch drum 6. The snap ring 49 is spaced apart from the second snap ring 39 and the ring gear 32.

The second snap ring 39 is positioned between the first snap ring 38 and the snap ring 49 in the direction of the rotation axis X.

As the second snap ring 39 is flatter in cross section than the first snap ring 38 so that the length a2 of the second snap ring 39 in the radial direction is short, there is a possibility that the ring gear 32 may be inclined toward the forward clutch 4. However, inclination of the ring gear 32 is prevented by the snap ring 49 which is located adjacent to the second snap ring 32.

Moreover, the ring gear 32 is arranged with a slight play as the spline fitting portion 321 of the ring gear 32 is positioned between the first snap ring 38 and the second snap ring 39. This allows self-alignment of the ring gear 32 even when the sun gear 31 or the carrier 34 becomes inclined relative to the rotation axis X.

In the planetary gear set 3, the ring gear 32 is set as the floating member and is fixed to the circumferential wall 6 of the clutch drum 6 (as a drum member). There is hence no need to newly provide a support member for supporting the ring gear 32 as the floating member.

Further, the drive plates 52 of the reverse brake 5 are supported on the circumferential wall 62 to which the ring gear 32 is fixed. In other words, the circumferential wall 62 is used for fixing and supporting of two component parts. This leads to a reduction in parts count, as compared to the case where dedicated parts are respectively provided for fixing and supporting of two component parts, so that a reduction in the manufacturing cost of the continuously variable transmission 1 can be expected.

Furthermore, the large-diameter portion 622 of the circumferential wall 62 on which the spline peak and valley sections 622a and 622b are formed is arranged over the reverse clutch 5 and the forward clutch 4 in the direction of the rotation axis X. In this arrangement, the spline peak and valley sections 622a and 622b of the large-diameter portion 622 located around the outer diameter side of the forward clutch 4 are utilized as the sensor area of the rotation speed sensor 120. The manufacturing cost of the continuously variable transmission 1 can be thus reduced as compared to the case where a dedicated sensor area is provided.

As described above, the forward/reverse switching mechanism 2 according to the present embodiment has the following configuration.

(1) The forward/reverse switching mechanism 2 includes: the planetary gear set 3 having the sun gear 31 that constitutes one of the input part and the output part, the carrier 34 that constitutes the other of the input part and the output part, and the ring gear 32; the reverse brake 5 (as a brake) adapted to fix the ring gear 32; the forward clutch 4 (as a clutch) adapted to connect the ring gear 32 and the sun gear 31 to each other; and the clutch drum 6 (as a drum member) coupled by spline fitting with the ring gear 32, the drive plate 52 (as a brake plate) on the ring gear 32 side of the reverse brake 5 and the driven plate 41 (as a clutch plate) on the ring gear 32 side of the forward clutch 4.

The ring gear 32 is set as the floating member and shaped to allow spline fitting. Then, the ring gear 32 and the drive plate 52 are spline-fitted to the circumferential wall 62 of the clutch drum 6 (as the drum member) to which the driven plate 41 is fitted. There is hence no need to newly provide a support member for supporting the ring gear 32 set as the floating member. There is also no need to newly provide a support member for supporting the drive plate 52. Therefore, the forward/reverse switching mechanism is reduced in parts count.

The forward/reverse switching mechanism 2 according to the present embodiment also has the following configuration.

(2) The clutch drum 6 (as the drum member) has the support tube 65 (as a cylindrical part) in which the rotation transmission shaft 9 (as a shaft) is inserted; and the support tube 65 is supported on the rotation transmission shaft 9 via the bushing BS (as a metal ring of less friction resistance) which is fitted around the rotation transmission shaft 9.

The clutch drum 6 (as the drum member) is consequently supported via the bearing BS on the rotation transmission shaft 9 which is connected to the sun gear 31.

The clutch drum 6 is provided with the support tube 65 (as the cylindrical part); and the rotation transmission shaft 9 is inserted in the support tube 65.

By the adoption of the support structure in which the support tube 65 of the clutch drum 6 is supported on the rotation transmission shaft 9 via the bushing BS, inclination of the clutch drum 6 relative to the rotation axis X, which is so-called axis inclination of the clutch drum 6, is prevented.

Since the bushing BS (as the metal ring of less friction resistance) is interposed between the inner circumference of the support tube 65 and the outer circumference of the rotation transmission shaft 9 so as to allow relative rotation of the rotation transmission shaft 9 (as the shaft) and the clutch drum 6 (as the drum member), the support structure is accomplished in a state that relative rotation of the sun gear 31 (connected to the shaft) and the ring gear 32 (connected to the drum member) is allowed.

Furthermore, the forward/reverse switching mechanism 2 according to the present embodiment has the following configuration.

(3) The forward/reverse switching mechanism is provided with the rotation speed sensor 120; the drive plate 52 (as the brake plate) on the ring gear 32 side of the reverse brake 5 is spline-fitted in the groove (spline valley section 622b) of the circumferential wall 62 of the clutch drum 6; the groove extends to a position overlapping with the forward clutch 4 (as the clutch) in the radial direction; and the groove overlapping with the forward clutch 4 in the radial direction is used as the detected part of the rotation speed sensor 120.

In this configuration, the fitting part for fitting with the drive plate 52 of the reverse brake 5 and the detected part of the rotation speed sensor 120 are formed at a time as one groove structure (spline valley section 622*b*) rather than formed separately. Since the groove is formed in the region between the fitting part and the detected part, a weight reduction of the drum member can be achieved.

Although the specific embodiment of the present invention has been described above, the present invention is not limited to the above-described specific embodiment. Various changes and modifications can be made to the above embodiment within the technical scope of the present invention.

The invention claimed is:

1. A forward/reverse switching mechanism, comprising:
 a planetary gear set having a sun gear, which constitutes one of an input part or an output part, a carrier which constitutes the other of the input part or the output part, and a ring gear;
 a brake adapted to fix the ring gear;
 a clutch adapted to connect the ring gear and the carrier to each other; and
 a drum member coupled by spline fitting with the ring gear, a brake plate provided on a side of the brake close to the ring gear and a clutch plate provided on a side of the clutch close to the ring gear,
 wherein the drum member is mounted on a bushing that is mounted on a shaft which is formed integrally with the sun gear.

2. The forward/reverse switching mechanism according to claim 1,
 wherein the forward/reverse switching mechanism comprises a rotation speed sensor,
 wherein the brake plate provided on the side of the brake close to the ring gear is spline-fitted to a groove formed in an outer circumference of the drum member,
 wherein the groove extends to a position overlapping with the clutch in a radial direction, and
 wherein the groove overlapping with the clutch in the radial direction is used as a detected part of the rotation speed sensor.

3. The forward/reverse switching mechanism according to claim 1,
 wherein the drum member has a support tube extending in a direction away from the sun gear, and
 wherein the support tube of the drum member is supported via the bushing on the shaft which is rotatable together with the sun gear.

4. The forward/reverse switching mechanism according to claim 3,
 wherein the forward/reverse switching mechanism comprises a bearing that supports the drum member,
 wherein the drum member has a communication part extending outwardly in a radial direction, and
 wherein the bearing is arranged to overlap with the communication part in an axis direction and to overlap with the support tube in the radial direction.

5. The forward/reverse switching mechanism according to claim 1,
 wherein the forward/reverse switching mechanism comprises a snap ring disposed between the clutch and the ring gear, with a clearance left between the ring gear and the snap ring.

6. The forward/reverse switching mechanism according to claim 1,
 wherein the sun gear is formed integrally on an outer circumference of the shaft so that a rotational driving force is input through the shaft to the sun gear.

* * * * *